United States Patent [19]

Fasolino

[11] Patent Number: 4,505,001
[45] Date of Patent: Mar. 19, 1985

[54] SURFACE CLEANING DEVICE

[75] Inventor: Gabriel V. Fasolino, Wilsonville, Oreg.

[73] Assignee: Delbert C. Hewitt, Wilsonville, Oreg.

[21] Appl. No.: 468,042

[22] Filed: Feb. 22, 1983

[51] Int. Cl.³ .............................. B60S 1/10; B60S 1/46
[52] U.S. Cl. ................................. 15/250 A; 15/250.01;
15/250.2; 15/250.3; 15/250.36; 15/313; 15/405;
239/229; 134/167 R
[58] Field of Search ............ 15/250.04, 250.01, 250.2,
15/250.22, 250.3, 250.36, 250.4, 250 A, 250 B,
250 R, 387, 382, 316, 405, 313; 134/167 R, 168
R; 239/229

[56] References Cited

U.S. PATENT DOCUMENTS

| 3,058,141 | 10/1962 | Christen | 15/250.2 |
| 3,897,605 | 8/1975 | Dickinson | 15/405 |
| 4,041,563 | 8/1977 | Steeves | 15/1.7 |
| 4,044,953 | 8/1977 | Vogel | 239/229 |

FOREIGN PATENT DOCUMENTS

| 2209137 | 8/1973 | Fed. Rep. of Germany | 134/167 R |
| 629579 | 9/1947 | United Kingdom | 239/229 |

*Primary Examiner*—Peter Feldman

[57] ABSTRACT

A flexible tube is suspended from a support arranged to be mounted adjacent a vehicle light surface to be cleaned. The support has an inlet for admitting compressed air to the tube whereby upon selected pressured flow of air through the tube, the tube whips back and forth in a flogging action to clean foreign material from the surface. The support also has an inlet for a cleaning solution used in combination with the whipping tube. The tube has a shape in cross section that tends to maintain it in the plane of the surface being cleaned. In modifications of the invention, a guide is provided to hold the tube in close to the surface being cleaned, and apertures are provided in the tube so that air pressure urges the tube toward the surface.

8 Claims, 7 Drawing Figures

U.S. Patent   Mar. 19, 1985   4,505,001
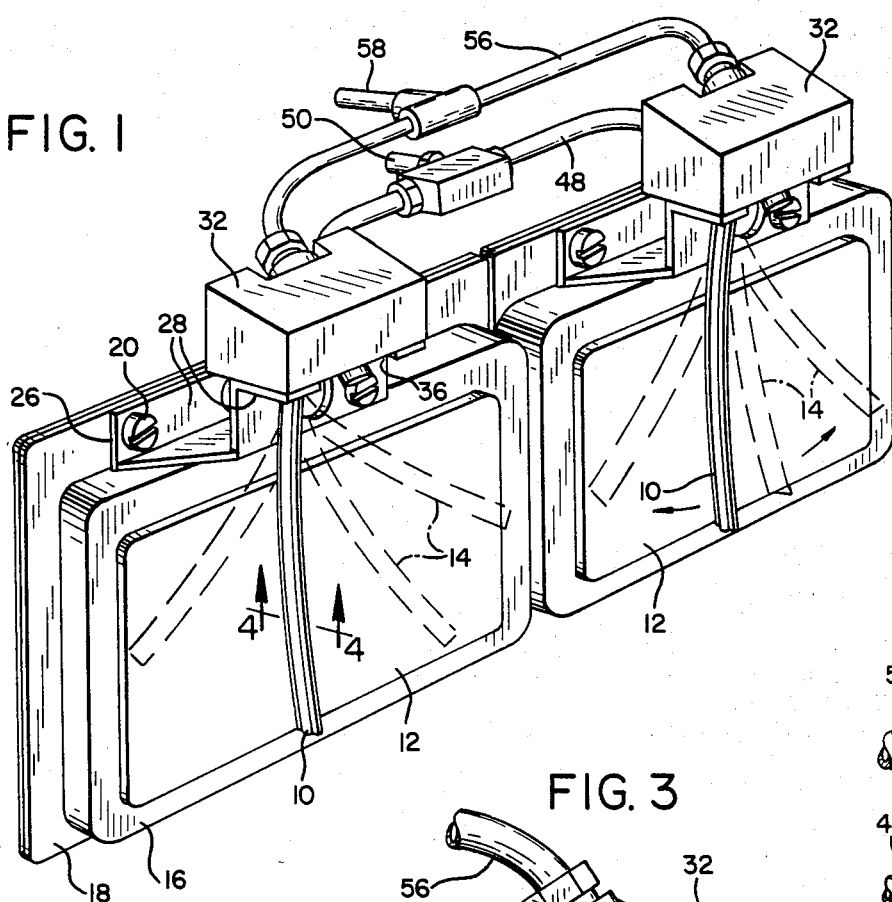
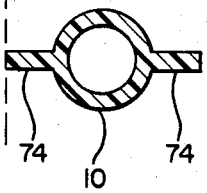
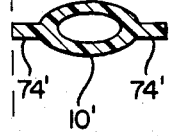
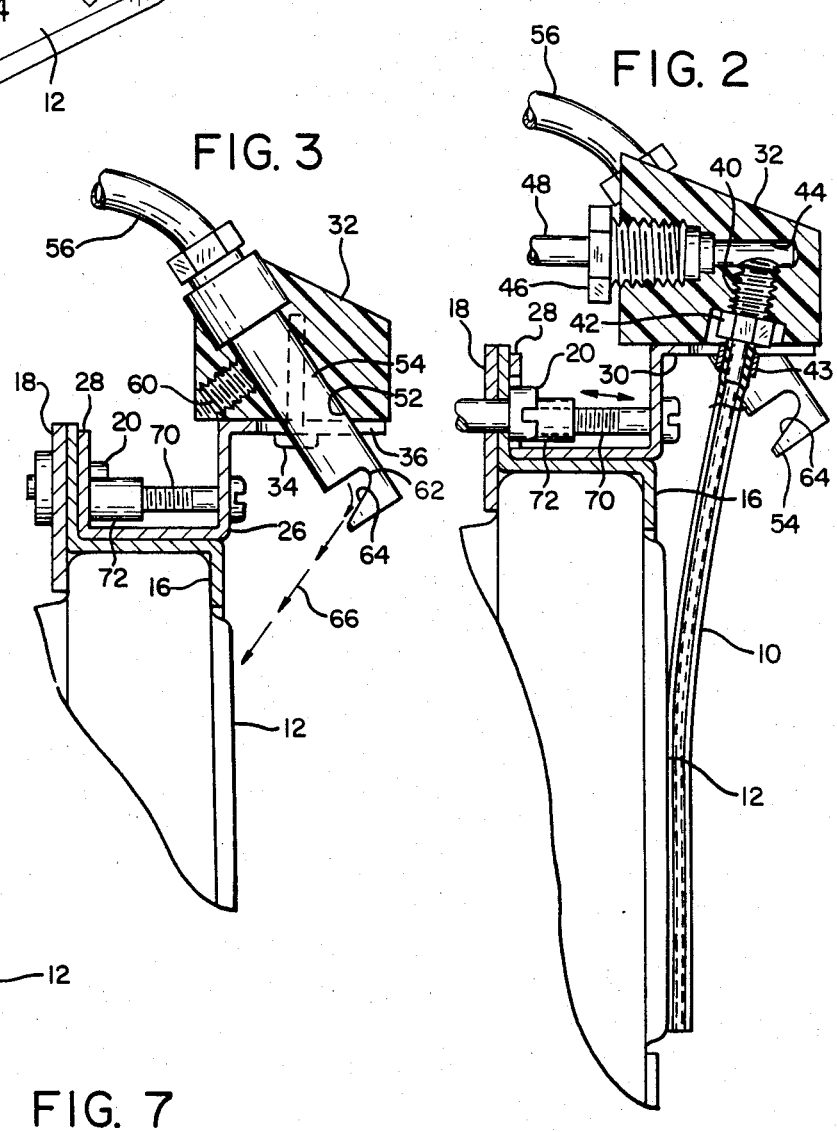
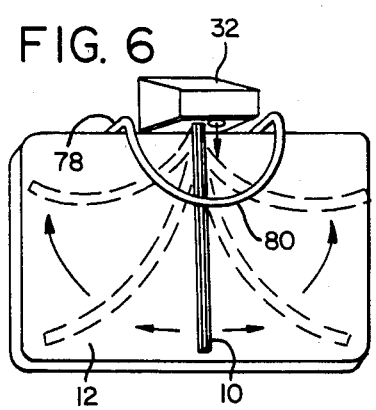
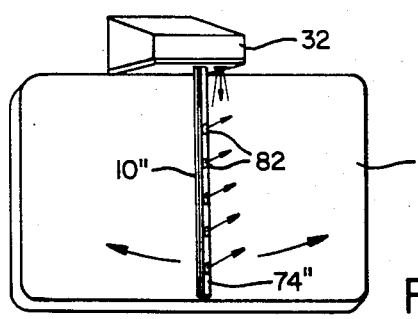

4,505,001

SURFACE CLEANING DEVICE

BACKGROUND OF THE INVENTION

This invention relates to new and useful improvements in surface cleaning devices.

The headlights of vehicles often become dirty and the output thereof can thus be seriously impaired. Devices have heretofore been employed to clean the headlight lens such as spray nozzles, reciprocating wipers, and other means. While such devices serve the intended purpose, they have many disadvantages. One disadvantage is that spray nozzles by themselves cannot thoroughly clean the surface. Also, reciprocating devices, while being capable of fairly well cleaning a surface, have pivoting, sliding, or other moving parts which add to the complexity of the device and furthermore require cleaning, lubrication, and other maintenance. Such prior devices are readily damaged because of the exposure of the mechanical moving parts.

SUMMARY OF THE INVENTION

According to the present invention and forming a primary objective thereof, a cleaning device for headlight lens surfaces or other surfaces is provided which is extremely simplified in structure, inexpensive to manufacture, and which does not employ mechanical parts that require lubrication or maintenance.

More specific objects of the invention are to provide a cleaning device which includes support means arranged to be mounted adjacent the surface to be cleaned and supporting a flexible tube that is driven in a whipping cleaning motion on the surface to be cleaned by fluid pressure, thus eliminating mechanical drive or operating means.

Another object of the invention is to provide a cleaning device of the type described having a structure especially adapting it for use in cleaning the lens surface of vehicle lights.

Another object is to provide a device of the type described that utilizes a novel flexible tube structure that provides means for effectively cleaning a surface and also means which maintain the tube in a plane parallel with said surface.

Still another object is to provide a cleaning device of the type described employing in a modified arrangement a guide member arranged to hold the flexible tube in the plane of the surface being cleaned.

In carrying out the objects of the invention, support means are provided which are arranged for mounted engagement adjacent a surface to be cleaned such as on a vehicle light mechanism and supporting one end of a flexible tube. The other or free end of the tube is open and the support means has passageways for admitting compressed fluid to the tube whereby such pressured flow causes the free end of the tube to whip back and forth to brush foreign material from the surface. The compressed fluid preferably comprises air and the support means also includes a passageway for directing a cleaning liquid to assist the tube in cleaning. The tube preferably has a specific structure which causes it to whip substantially in a plane parallel with the surface to be cleaned. One embodiment of the tube utilizes longitudinal ribs extending approximately at right angles to the surface to be cleaned for maintaining the tube in its whipping action in a plane parallel with the lens surface. Another embodiment utilizes apertures in the tube on the side opposite from the surface being cleaned, those apertures causing outflow therefrom to urge the tube toward the surface to be cleaned. An embodiment of the invention also includes mechanical guide means for maintaining the tube in a plane parallel with the surface to be cleaned.

The invention will be better understood and additional objects and advantages will become apparent from the following description taken in connection with the accompanying drawings.

BRIEF DESCRIPTION OF THE DRAWINGS

FIG. 1 is a perspective view of a vehicle light assembly showing the present surface cleaning device associated therewith;

FIG. 2 is an enlarged vertical sectional view of the cleaning device, this view being taken substantially centrally between the sides of such cleaning device;

FIG. 3 is a view similar to FIG. 2 but offset from the center to show other structure;

FIG. 4 is an enlarged sectional view of a first form of flexible tube which accomplishes the cleaning action;

FIG. 5 is a view similar to FIG. 4 but showing another form of tube;

FIG. 6 is a perspective view of a vehicle headlamp lens and showing an embodiment of the invention employing mechanical guide means for the flexible tube; and FIG. 7 is a perspective view of a vehicle headlamp lens showing a further embodiment of tube structure.

DETAILED DESCRIPTION OF PREFERRED EMBODIMENT

According to the invention, and which reference first to FIGS. 1 and 2, applicant utilizes a flexible tube 10 to clean a surface 12 by a whipping or flogging action of the tube resulting from passage of fluid, such as air, under pressure therethrough. That is, as is well known, the free end of a flexible tube or hose will whip violently when fluid is forced therethrough under relatively high pressure. Thus, by supporting a flexible tube 10 at one of its ends adjacent the surface 12 and allowing the other end free movement and subjecting the tube to fluid pressure, it will whip back and forth in a flogging movement in a pattern designated by broken lines 14 in FIG. 1. By using a relatively light-weight tube 10 and a somewhat elevated pressure, such as the air pressure existing on many vehicles, a violent beating but nondamaging cleaning action is provided for the surface 12.

The invention can be used for cleaning any surface, but it is particularly adaptable for cleaning headlight lens of trucks or other vehicles, as well as side view mirrors, etc. Pressured air is usually available on these vehicles and is used for operating the tube 10. Application of the invention will be described in connection with vehicle headlight assemblies. As is well known, the lens 12 of a vehicle light is mounted in a retainer 16 in turn secured to a frame 18 by screws 20. Frame 18 is adjustably attached to the vehicle body in a well known manner. Chrome trim 22, FIG. 3, is also usually used in the headlight assembly.

The present device employs a mounting bracket 26 having a rear vertical flange 28 by means of which securement is made to the adjustable frame 18, as by the same screws 20 used to mount the retainer 16. Bracket 26 is adapted to be located just above the headlight retainer 16 and below the trim 22.

The mounting bracket 26 has a top, forwardly projecting horizontal flange 30 to which a head member 32 is secured, as by screws 34 extending up from underneath the flange and threadedly engaged in the head member, the flange 30 having a central slot 36 between the sides thereof to provide mounting clearance for the tube 10 and for liquid spray means, to be described.

The head 32 projects forwardly of the lens surface 12 and has a bottom threaded bore 40 arranged to receive a fitting 42 supporting the hose 10 as by a clamp 43. Bore 40 is angled somewhat toward the lens surface 12 so that the hose 10 likewise is angled toward such surface. Fitting 42 is hollow and communicates at its upper end with a longitudinal passageway 44 in the head 32 threadedly receiving a rear fitting 46 connected to a conduit 48 leading to an air supply system 50. Passageway 44 and fitting 42 are located substantially centrally between the sides of the head 32.

Offset to one side of the central passageway 44 is a bore 52, FIG. 3, which receives a nozzle 54 from the rear. This nozzle is connected to a conduit 56 leading to a liquid supply system 58.

The bore 52 is suitably shaped to receive the nozzle 54 in mounted relation, the latter being removably held in place by a setscrew 60. The nozzle has a bottom notch 62 forward of the lens surface 12. The forward defining end 64 of notch 60 is angled rearward and downward to direct the cleaning liquid downwardly against the lens surface, as designated by the arrows 66 in FIG. 3. The notch end 64 also serves as a splash surface which causes the liquid, when admitted under pressure, to deflect sideways to enlarge the spray pattern onto the lens surface.

In operation, air under pressure is admitted to the passageway 44 and the tube 10, and with sufficient pressure of the air and with sufficient flexibility of the tube 10, the tube whips violently against the surface 12 to clean off any foreign particles. Liquid may also be supplied from the nozzle 54 if necessary, and any suitable sequence of operation of the air and the cleaning liquid may be used. The splash surface 64 of the nozzle will distribute the cleaning liquid fairly well onto the lens surface. The whipping action of the tube will also assist in distribution. The whipping action of the tube also almost immediately clears the surface of the cleaning liquid and substantially dries the surface as well.

The horizontal flange 30 may be suitably angled for best engagement of the tube and cleaning fluid with the surface 12. This adjustment can also be made through the provision of an adjusting screw 70 extending inwardly through the bracket 26 and having threaded engagement with a nut 72 integral with the rear flange 28. By suitable threaded positioning of adjusting screw 70, the front portion of flange 30 may be suitably bent to a desired angle. Also, since the bracket 26 is secured to the adjustable frame 18, the present assembly moves with the headlights when the latter are adjusted. The head 32 is thus always properly aligned with the headlight.

FIG. 4 shows a first form of construction of the tube 10 wherein such tube is round in cross section and has longitudinal ribs 74 in diametrical opposite position. The tube is attached to the fitting 42 such that the ribs 74 extend at right angles to the lens surface 12 whereby the whipping action of the tube will be primarily from side to side rather than forward against the reinforcement of the ribs 74. The whipping action will thus tend to operate parallel with the plane of the lens surface. Rib 74 adjacent the lens surface also serves as a squeegee to remove foreign particles and cleaning fluid. Tube 10 preferably is of lightweight, inexpensive, tough plastic, and can be readily replaced when necessary. It is transparent and thus does not materially reduce the output of the lights.

FIG. 5 shows a modified form of tube 10'. This tube, similar to tube 10, has diametrically opposite longitudinal ribs 74'. To provide further reinforcement in the direction at right angles to the reflecting surface, the tube is oval in cross section rather than round.

FIG. 6 shows an embodiment of the invention employing a guide 78 which is arranged to be suitably secured to the bracket 26 and employs a thin arcuate downward rigid extension 80 spaced a short distance in front of the lens surface 12. The tube 10 operates between the guide portion 80 and the lens surface and is positively guided in a movement parallel with the said surface.

FIG. 7 shows an embodiment of the invention wherein a tube 10" has a structure similar to that shown in FIG. 4 except the outwardly facing rib 74" has a plurality of apertures 82 extending from the edge of the rib to the inner portion of the tube whereby air pressure which is used to operate the tube in its whipping action will also escape through these apertures and urge the tube against the lens surface 12.

The present invention thus provides a cleaning device that is simplified in its structure, inexpensive to manufacture, and reliable in operation. It is easily maintained, not requiring any lubrication, adjustment, or repair. If necessary, the tube 10 may be replaced simply by unscrewing the old tube and its fitting and installing a new assembly.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described my invention, I claim:

1. A cleaning device for the lens surface of vehicle lights having a support frame, said device comprising
    (a) support means arranged to be mounted on said light adjacent said lens surface,
    (b) a flexible tube having opposite ends,
    (c) one end of said tube being secured to said support means for support adjacent said lens surface,
    (d) the other end of said tube being open,
    (e) said tube being supported in substantially parallel relation with said lens and in overlapping engagement therewith,
    (f) and means at the supported end of said tube for admitting pressured fluid whereby upon selected pressured flow of fluid through said tube, said tube whips back and forth in flogging engagement with said surface to beat foreign material off said lens surface.

2. The cleaning device of claim 1 wherein said means for admitting said pressured fluid comprise air inlet means, and means at the supported end of said tube for directing a liquid against said lens surface to assist said tube in cleaning.

3. The cleaning device of claim 1 wherein said tube has a greater dimension in its body thickness that extends at right angles to the lens surface than the body thickness that extends parallel to said surface whereby the whipping action will mostly be confined in a plane parallel with the lens surface.

4. The cleaning device of claim 1 wherein said tube is oval in cross section and is supported by said support means with its major axis extending approximately at right angles to the lens surface.

5. The cleaning device of claim 1 wherein said tube has exterior radial rib means extending approximately at right angles to the lens surface.

6. The cleaning device of claim 1 including guide means confining the whipping action of said tube in a plane substantially parallel with the lens surface.

7. The cleaning device of claim 1 wherein said tube has aperture means on the side thereof opposite from the lens surface whereby pressured outflow of fluid from said aperture means urges said tube toward the lens surface.

8. The cleaning device of claim 1 wherein said support means is arranged to be secured to the support frame of the vehicle light, said support means including air inlet means communicating with said tube for providing air as said compressed fluid, said support means also including cleaning liquid inlet and discharge means, the said discharge means being directed toward the lens surface for directing a cleaning liquid against the lens surface to assist said tube in cleaning.

* * * * *